United States Patent [19]

Shetler

[11] 4,290,454

[45] Sep. 22, 1981

[54] BACK FLOW VALVE

[76] Inventor: Earl B. Shetler, 9508 Tuscola Rd., Clio, Mich. 48420

[21] Appl. No.: 164,813

[22] Filed: Jun. 30, 1980

[51] Int. Cl.³ ............................................. F16K 15/14
[52] U.S. Cl. .................................................. 137/853
[58] Field of Search ...................... 137/512.15, 516.15, 137/853, 860

[56] References Cited

U.S. PATENT DOCUMENTS

| | | | |
|---|---|---|---|
| 384,306 | 6/1888 | Bourdil | 137/853 X |
| 1,800,066 | 4/1931 | Glass | 137/853 X |
| 2,715,980 | 8/1955 | Frick | 137/853 X |
| 3,179,124 | 4/1965 | Haring | 137/853 X |
| 3,448,766 | 6/1969 | Schule | 137/853 X |
| 3,814,132 | 6/1974 | Greenwood et al. | 137/853 X |
| 4,039,139 | 8/1977 | Bird | 137/853 X |

*Primary Examiner*—William R. Cline
*Attorney, Agent, or Firm*—Barnes, Kisselle, Raisch & Choate

[57] ABSTRACT

A back flow valve comprising a housing having an inlet and an outlet and a tube mounted in the housing and having a open end communicating with the inlet in said housing. The tube has the other end thereof closed and has a plurality of circumferentially and longitudinally spaced openings at the center thereof such that liquid can only flow from the inlet to the housing through the openings in the tube to the outlet of said housing. An elastic sleeve is telescoped over the tube and normally closes the opening, the inside diameter of the sleeve being less than the outer diameter of the tube. The tube has longitudinally spaced abutments adjacent the ends of the sleeve and the length of the sleeve is less than the longitudinal distance between the abutments. The ends of the sleeve have portions thereof extending axially beyond other portions thereof such that as liquid pressure is built up, the liquid stretches the sleeve and flows out of the openings in the tube and along the exterior of the tube and the liquid engages said abutments and in cooperation with the longitudinally extending portions causes the sleeve to rotate facilitating the opening and closing of the sleeve even after prolonged periods of time and preventing foreign matter from remaining between the sleeve and the tube.

13 Claims, 5 Drawing Figures

U.S. Patent  Sep. 22, 1981  4,290,454
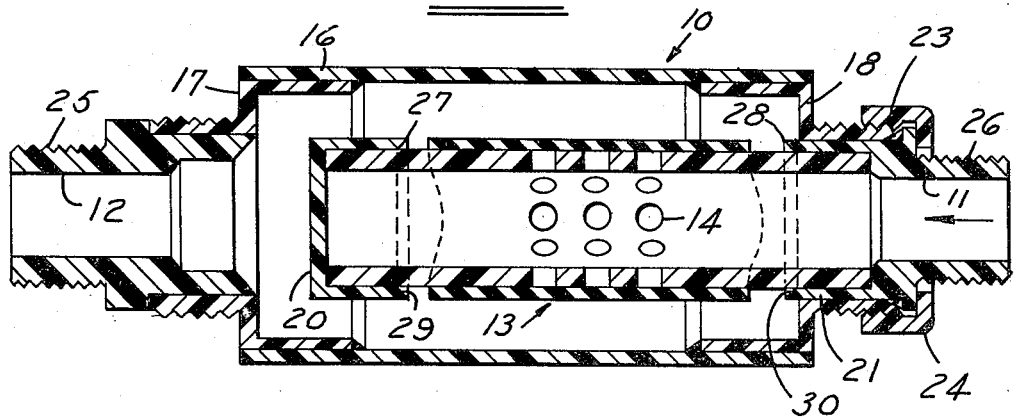
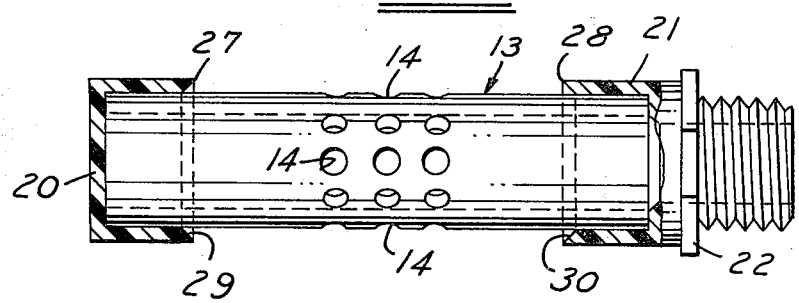
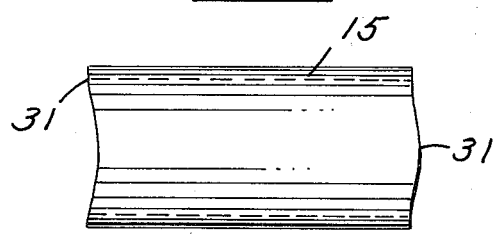
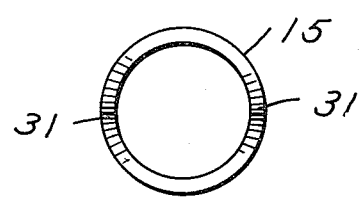
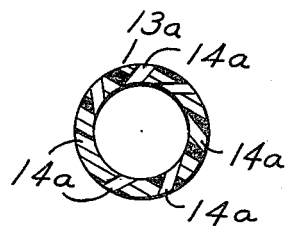

BACK FLOW VALVE

This invention relates to back flow valves and particularly to back flow valves utilized to control flow in a water line of a house or building.

BACKGROUND AND SUMMARY OF THE INVENTION

When water is being supplied to a home or building from a supply line connected to a pump or central water source, it is desirable to provide a back flow valve which will preclude flow of contaminated liquid back into the water system.

The present invention is directed to a back flow valve which is effective, low in cost, has long life, and will not be adversely affected by long periods of non-use or by foreign matter.

The back flow valve embodying the invention comprises a housing having an inlet and an outlet and a tube mounted in the housing and having an open end communicating with the inlet to the housing. The tube has the other end thereof closed, and has a plurality of circumferentially and longitudinally spaced openings at the center thereof such that liquid can only flow from the inlet to the housing through the openings to the outlet of the housing. An elastic sleeve is telescoped over the tube and normally closes the openings, the inside diameter of the sleeve being less than the outer diameter of the tube. The tube has longitudinally spaced abutments adjacent the ends of the sleeve and the length of the sleeve is less than the longitudinal distance between the abutments. The ends of the sleeve have portions thereof extending axially beyond other portions thereof such that as liquid pressure is built up, the liquid stretches the sleeve and flows out of the openings in the tube and along the exterior of the tube and the liquid engages the abutments and in cooperation with the longitudinally extending portions causes said sleeve to rotate facilitating the opening and closing of the sleeve even after prolonged periods of time.

Although various prior art uses have been made of elastic sleeves in valves for various purposes, such as in U.S. Pat. Nos. 384,306, 1,800,066, 2,662,485, 3,179,124 and 3,448,766, I am not aware that such patents have been successful in actual use for controlling the flow of liquid to or from a home or building. Moreover, the constructions of back flow valve shown in these patents differ in structure and function from that of my invention.

DESCRIPTION OF THE DRAWINGS

FIG. 1 is a longitudinal sectional view of a back flow valve embodying the invention.

FIG. 2 is a part sectional view of a portion of a valve.

FIG. 3 is a side view of another portion of a valve.

FIG. 4 is an end view of the part of the valve shown in FIG. 3.

FIG. 5 is a cross sectional view of a modified form of tube utilized in the back flow valve.

DESCRIPTION

Referring to the drawings, the back flow valve embodying the invention is intended to be connected at the inlet of a water line from a pump or other water source to a home or building. The back flow valve comprises a housing 10 having an inlet 11 and an outlet 12. A closed end tube 13 having a plurality of openings 14 therein is positioned in the housing to isolate the inlet from the interior of the housing, as presently described, so that flow of liquid from the pump or other source can occur only through the openings 14 to the outlet 12. An elastic sleeve 15 is telescoped over the tube 13 and normally closes the openings so that in order for water to flow, the sleeve must stretch permitting the water to flow through the openings 14 and axially toward the end of the sleeve into the housing and out of the outlet 12.

The housing 10 is made of plastic such as PVC and includes a cylinder portion 16 and end fittings 17, 18. The tube 13 is also made of plastic such as PVC and comprises a tube portion 19 and end cap 20, and an end fitting 21 having a flange 22 which engages a seal 23. A flange nut 24 is telescoped over and threaded on the exterior of fitment 18 to force the flange 22 against the seal 23 and, in turn, against the end of the fitment 18, to hold the tube in position closing the end of the housing. The fitting 17 and fitting 21 have threads 25, 26, respectively, for connection to the home or building and water source.

Further, in accordance with the invention, the sleeve 15 has an inside diameter less than the outside diameter of the tube 19 so that it normally sealingly engages the periphery of the tube 19. The cap 20 and fitment 21 include abutments 27, 28 that have continuous annular surfaces 29, 30 that extend inwardly toward the respective ends of the tube. The sleeve 15 has a length less than the distance between the aubtments 27, 28 and includes scallops or waves 31 at the ends which define portions that extend axially beyond other portions. As shown, two scallops or waves 31 are provided at each end. The abutments 27, 28 perform two functions, namely, to confine the sleeve within a given area and to direct the water flow back to the wave cut ends of the sleeve. A row of holes 14 is preferably positioned at the center of the tube and the remaining holes extend outwardly therefrom with one group or row of holes at the center and the others preferably spaced equally outwardly therefrom. Further, the outermost row of holes is preferably equidistant from the abutments.

In operation, water normally flows from the inlet 11 through the openings 14 forcing the sleeve to stretch so that the water can flow between the tube and the sleeve towards the ends of the sleeve. As the water flows, the combined effect of the abutments and the wave cut of the ends of the sleeve produces a rotation as well as a slight axial movement of the sleeve.

It has been found that if the rubber sleeve is not wave cut, that is, if it is cut straight along the diametral plane, the sleeve will not revolve. It has been further found that the sleeve must have a length less than the distance between the abutments. Experiments have shown that a longer sleeve will have only an erratic performance. The valve may be mounted horizontally, vertically or at an angle.

Testing of the valve at pressures ranging between 20 and 60 p.s.i. indicates that the sleeve will revolve at a flow rate of 6 gallons per minute and the pressures will not vary the performance.

The rotation of the sleeve insures that the sleeve will not become adhered to the tube in case of non-use, that is, when there is not water flowing, and will also permit a self cleaning action in the event that foreign matter tends to become trapped between the sleeve and the tube.

Satisfactory results have been achieved with a back flow valve having a sleeve of gum rubber having a durometer of 35=5 on the A scale and having the following dimensions:

| Length of the sleeve | ¼" less than distance between abutments |
|---|---|
| Inside diameter of the sleeve | 1" |
| Outside diameter of the sleeve | 1¼" |
| Depth of waves 31 | ⅛" |
| Number of waves | 2 |
| 3 rows of ¼" holes, 8 holes in each row | |
| Outside diameter of tube | 1.050" |
| Thickness of tube | 1/16" |
| Distance between abutments 27, 28 | 3" |
| Clearance between end of sleeve and abutment | ⅛" |
| Distance between outer row of holes and corresponding abutment | 1" |

The modified form of tube 13a shown in FIG. 5 instead of tube 13 produces a lifting and rotation of sleeve 15 at a lesser flow rate. Tube 13a has circumferentially spaced openings 14a which have their axes at an angle to a radius and all inclined in the same direction so that the flow of water produces a rotational force on the sleeve which rotates the sleeve. In an example, where the openings 14a are the same size as the openings 40 but an angle of 45°, the sleeve will revolve at 5½ gallons per minute rather than six gallons per minute.

I claim:

1. A back flow valve comprising
   a housing having an inlet and an outlet,
   a tube mounted in said housing and having an open end communicating with the inlet to said housing,
   said tube having the other end thereof closed,
   said tube having a plurality of circumferentially and longitudinally spaced openings at the center thereof such that fluid can only flow from the inlet to said housing through said openings to the outlet of said housing,
   an elastic sleeve telescoped over said tube and normally closing said openings,
   the inside diameter of said sleeve being less than the outer diameter of said tube,
   said tube having longitudinally spaced abutments adjacent the ends of said sleeve,
   the length of said sleeve being less than the longitudinal distance between said abutments,
   the ends of said sleeve having portions thereof extending axially beyond other portions thereof such that as fluid pressure is built up, the sleeve stretches and liquid flows out of said openings in said tube and along the exterior of said tube and the liquid engages said abutments and in cooperation with said longitudinally extending portions causes said sleeve to rotate facilitating the opening and closing of said sleeve even after prolonged periods of time and preventing foreign matter from remaining between said sleeve and said tube.

2. The back flow valve set forth in claim 1 wherein said abutments include surfaces extending angularly inwardly toward the respective ends of said tube.

3. The back flow valve set forth in claim 2 wherein said surfaces comprise portions of an annular continuous surface.

4. The back flow valve set forth in claims 1, 2 or 3 wherein said axially extending portions of said sleeve comprise scallops or waves.

5. The back flow valve set forth in claim 4 wherein each end has two waves thereon.

6. The back flow valve set forth in claim 5 wherein the outer diameter of said sleeve is substantially equal to the outer diameter of said abutments.

7. The back flow valve set forth in claim 1 wherein said holes are equally spaced longitudinally and circumferentially.

8. The back flow valve set forth in claim 7 wherein said holes are positioned substantially at the center of said tube and equidistant from the center of said tube.

9. The back flow valve set forth in claim 8 wherein said outer holes are spaced about one-third from the ends of said sleeve about one-third the length of said sleeve.

10. The back flow valve set forth in claim 8 wherein the outer holes are spaced equidistantly from the abutments.

11. The back flow valve set forth in claim 1 wherein said holes have their axes forming an angle with a radius and are all inclined in the same direction so that flow of water therethrough tends to rotate said sleeve.

12. A back flow valve comprising
    a housing having an inlet and an outlet,
    a tube mounted in said housing and having an open end communicating with the inlet to said housing,
    said tube having the other end thereof closed,
    said tube having a plurality of circumferentially and longitudinally spaced openings at the center thereof such that fluid can only flow from the inlet to said housing through said openings to the outlet of said housing,
    said holes being positioned substantially at the center of said tube and equidistant from the center of said tube,
    an elastic sleeve telescoped over said tube and normally closing said openings,
    the inside diameter of said sleeve being less than the outer diameter of said tube,
    said tube having longitudinally spaced abutments adjacent the ends of said sleeve,
    the outer holes are spaced equidistantly from the abutments,
    the length of said sleeve being less than the longitudinal distance between said abutments,
    said abutments including annular surfaces extending angularly inwardly toward the respective ends of said tube,
    said axially extending portions of said sleeve comprising scallops or waves,
    the ends of said sleeve having portions thereof comprising scallops or waves extending axially beyond other portions thereof such that as fluid pressure is built up, the sleeve stretches and liquid flows out of said openings in said tube and along the exterior of said tube and the liquid engages said abutments and in cooperation with said longitudinally extending portions causes said sleeve to rotate facilitating the opening and closing of said sleeve even after prolonged periods of time and preventing foreign matter from remaining between said sleeve and said tube.

13. The back flow valve set forth in claim 12 wherein said holes have their axes forming an angle with a radius and are all inclined in the same direction so that flow of water therethrough tends to rotate said sleeve.

* * * * *